United States Patent [19]

Armijo et al.

[11] 4,372,817
[45] * Feb. 8, 1983

[54] NUCLEAR FUEL ELEMENT

[75] Inventors: Joseph S. Armijo, Saratoga, Calif.; Louis F. Coffin, Jr., Schenectady, N.Y.

[73] Assignee: General Electric Company, Schenectady, N.Y.

[ * ] Notice: The portion of the term of this patent subsequent to Apr. 29, 1997, has been disclaimed.

[21] Appl. No.: 14,348

[22] Filed: Feb. 23, 1979

Related U.S. Application Data

[63] Continuation of Ser. No. 727,183, Sep. 27, 1976, abandoned.

[51] Int. Cl.³ .............................................. G21C 3/20
[52] U.S. Cl. ................................................. 376/417
[58] Field of Search ................................... 176/54–56, 176/66, 68, 79, 91 R, 91 SP, 82

[56] References Cited

U.S. PATENT DOCUMENTS

| | | | |
|---|---|---|---|
| 2,932,887 | 4/1960 | McCunig et al. | 29/504 |
| 3,053,743 | 9/1962 | Cain, Jr. | 176/79 |
| 3,145,150 | 8/1964 | Gylfe et al. | 176/91 R |
| 3,212,988 | 10/1965 | Ringot | 176/82 |
| 3,262,860 | 1/1966 | Zebroski | 176/91 R |
| 3,331,748 | 7/1967 | Feraday | 176/70 |
| 3,365,371 | 1/1968 | Lass et al. | 176/66 |
| 3,442,761 | 5/1969 | Feraday | 176/91 R |
| 3,466,226 | 9/1969 | Lass | 176/68 |
| 3,850,584 | 11/1974 | Bohm et al. | 29/194 |

FOREIGN PATENT DOCUMENTS

| | | | |
|---|---|---|---|
| 1639249 | 2/1968 | Fed. Rep. of Germany . | |
| 49-11199 | 1/1974 | Japan . | |
| 933500 | 8/1963 | United Kingdom | 176/91 R |

OTHER PUBLICATIONS

Zirconium, 2nd Ed., Butterworths Scientific Publications, London, (11/1/57), G. L. Miller, pp. 474–475.
Elements of Physical Metallurgy, 2nd Ed., Addison-Wesley Pub. Co., A. Guy (1/25/68) pp. 194–195.

Primary Examiner—S. A. Cangialosi
Attorney, Agent, or Firm—Leo I. MaLossi; James C. Davis, Jr.

[57] ABSTRACT

A nuclear fuel element for use in the core of a nuclear reactor is disclosed and has a composite cladding having a substrate and a metal barrier metallurgically bonded on the inside surface of the substrate so that the metal barrier forms a shield between the substrate and the nuclear fuel material held within the cladding. The metal barrier forms about 1 to about 30 percent of the thickness of the cladding and is comprised of a low neutron absorption metal of substantially pure zirconium. The metal barrier serves as a preferential reaction site for gaseous impurities and fission products and protects the substrate from contact and reaction with such impurities and fission products. The substrate of the composite cladding is selected from conventional cladding materials and preferably is a zirconium alloy. Methods of manufacturing the composite cladding are also disclosed.

4 Claims, 2 Drawing Figures

NUCLEAR FUEL ELEMENT

The Government has rights in this invention pursuant to Subcontract No. 3-20-46 under Prime Contract EN-77-C-02-4473 awarded by the U.S. Department of Energy.

This is a continuation, of application Ser. No. 727,183, filed Sept. 27, 1976, now abandoned.

BACKGROUND OF THE INVENTION

This invention relates broadly to an improvement in nuclear fuel elements for use in the core of nuclear fission reactors, and more particularly to an improved nuclear fuel element having a composite cladding having a substrate and a metal barrier metallurgically bonded to the inside surface of the substrate.

Nuclear reactors are presently being designed, constructed and operated in which the nuclear fuel is contained in fuel elements which can have various geometric shapes, such as plates, tubes, or rods. The fuel material is usually enclosed in a corrosion-resistant, nonreactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys, niobium (columbium), certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is promoted by localized mechanical stresses due to fuel cladding differential expansion (stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction during operation of a nuclear reactor. The localized stress is exaggerated by high friction between the fuel and the cladding.

Within the confines of a sealed fuel element, hydrogen gas can be generated by the slow reaction between the cladding and residual water inside the cladding and this hydrogen gas may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor and this occurs in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,396. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Patent Publication No. SHO 47-46559 dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Patent Publication No. SHO 47-14200 in which the coating of one of two groups of pellets is with a layer of silicon carbide and the other group is coated with a layer of pyrocarbon or metal carbide.

The coating of nuclear fuel material introduces reliability problems in that failure to achieve uniform coatings free of faults is difficult. Further, the deterioration of the coating can introduce problems with the long-lived performance of the nuclear fuel material.

U.S. patent application Ser. No. 330,152 filed Feb. 6, 1973 discloses a method for preventing corrosion of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555 dated February, 1964 discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of ten to fifteen times the penalty for a zirconium alloy layer of the same thickness.

U.S. Pat. No. 3,502,549 discloses a method of protecting zirconium and its alloys by the electrolytic deposition of chrome to provide a composite material useful for nuclear reactors. A method for electrolytic deposition of copper on Zircaloy - 2 surfaces and subsequent heat treatment for the purpose of obtaining surface diffusion of the electrolytically deposited metal is presented in *Energia Nucleare* Volume 11, number 9 (September 1964) at pages 505–508. In *Stability and Compatibility of Hydrogen Barriers Applied to Zirconium Alloys* by F. Brossa et al (European Atomic Energy Community, Joint Nuclear Research Center, EUR 4098e 1969), methods of deposition of different coatings and their efficiency as hydrogen diffusion barriers are described along with an Al-Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin* by W. C. Schickner et al (BMl-757, Technical Information Service, 1952). U.S. Pat. No. 3,625,821 presents a fuel element for a nuclear reactor having a fuel cladding tube with the inner surface of the tube being coated with a retaining metal of low neutron capture cross section such as nickel and having finely dispersed particles of a burnable poison disposed therein. *Reactor Development Program Progress Report* of August, 1973 (ANL-RDP-19) discloses a chemical getter arrangement of a sacrificial layer of chromium on the inner surface of a stainless steel cladding.

Another approach has been to introduce a barrier between the nuclear fuel material and the cladding holding the nuclear fuel material as disclosed in U.S. Pat. No. 3,230,150 (copper foil), German Patent Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. patent application Ser. No. 441,131, filed Feb. 11, 1974 (refractory metal such as molybdenum, tungsten, rhenium, niobium and alloys thereof in the form of a tube or foil of single or multiple layers or a coating on the internal surface of the cladding), and U.S. patent application Ser. No. 441,133, filed Feb. 11, 1974 (liner of zirconium, niobium or alloys thereof between the nuclear fuel and the cladding with a coating of a high lubricity material between the liner and the cladding).

Accordingly it has remained desirable to develop nuclear fuel elements minimizing the problems discussed above.

SUMMARY OF THE INVENTION

A particularly effective nuclear fuel element for use in the core of a nuclear reactor has a composite cladding having a substrate and a metal barrier metallurgically bonded on the inside surface of the substrate so that the metal barrier shields the substrate from the nuclear fuel material held in cladding. The metal barrier forms about 1 to about 30 percent of the thickness of the cladding and is comprised of a low neutron absorption metal of substantially pure zirconium. The metal barrier serves as a preferential site for reaction with volatile impurities or fission products present inside the nuclear fuel element and in this manner serves to protect the substrate from exposure to and attack by the volatile impurities or fission products. The substrate portion of the cladding is completely unchanged in design and function from previous practice for a nuclear reactor and is selected from conventional cladding materials such as zirconium alloys. Methods of manufacturing the composite cladding are also presented including (1) fitting a hollow tube of the metal barrier inside a hollow billet of the substrate, explosively bonding the tube to the billet and extruding the composite followed by tube reduction, (2) fitting a hollow tube of the metal barrier inside a hollow billet of the substrate, heating the tube and billet under compressive loads to produce diffusion bonding of the tube to the billet and extruding the composite followed by tube reduction, and (3) fitting a tube of the metal barrier inside a hollow billet of the substrate and extruding the composite followed by tube reduction. This invention has the striking advantage that the substrate of the cladding is protected from contact with fission products, corrosive gases, etc., by the metallurgically bonded metal barrier and the metal barrier does not introduce any appreciable neutron capture penalties, heat transfer penalties, or materials incompatibility problems. The metal barrier also protects the substrate from localized stresses produced at the fuel-metal barrier interface.

OBJECTS OF THE INVENTION

It is an object of this invention to provide a nuclear fuel element capable of operating in nuclear reactors for extended periods of time without the occurrence of splitting of the cladding, corrosion of the cladding, or other fuel failure problems.

It is another object of this invention to provide a nuclear fuel element with a composite cladding having a substrate and a metal barrier metallurgically bonded on the inside surface of the substrate so that the metallurgical bond provides a long lived connection between the substrate and the metal barrier.

Still another object of this invention is to provide a nuclear fuel element having a composite cladding of a substrate and a metal barrier metallurgically bonded on the inside surface of the substrate with the metal barrier being comprised of substantially pure zirconium.

Another object of this invention is to provide an economical process for producing a cladding for a nuclear fuel element using metal extrusion and tube reduction to achieve a composite cladding.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
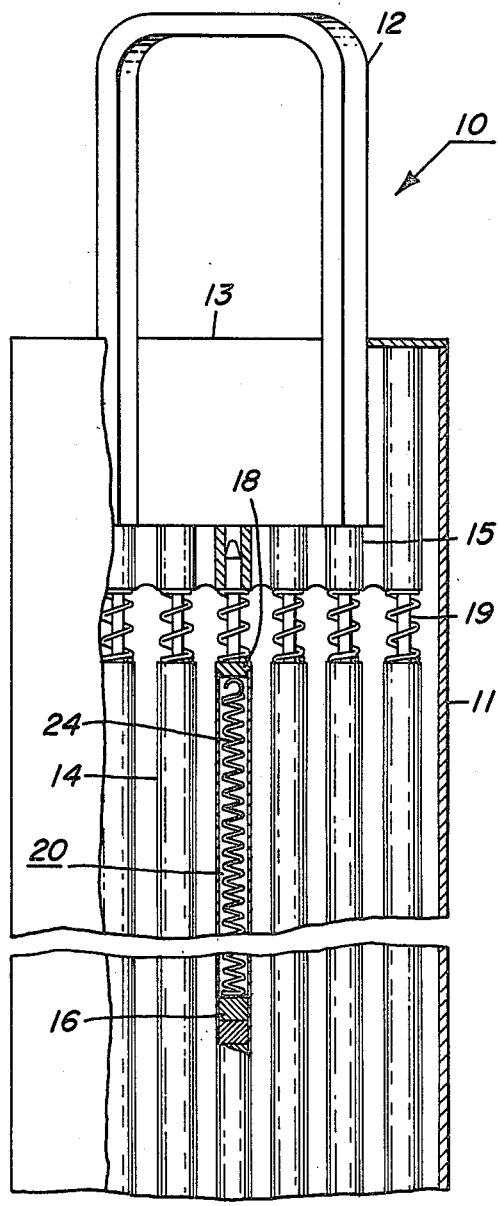
FIG. 1 presents a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption, and resistance to bowing and vibration which is occasionally caused by flow of the coolant at high velocity.

A nuclear fuel element or rod 14 is shown in a partial section in FIG. 1 constructed according to the teachings of this invention. The fuel element includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
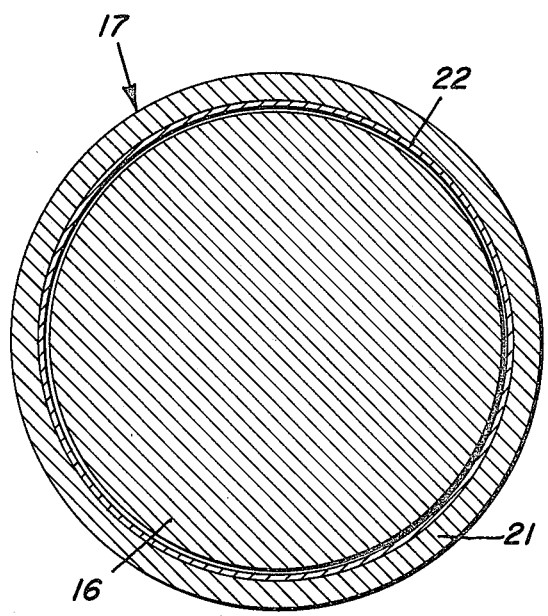
FIG. 2 presents an enlarged cross sectional view of the nuclear fuel element in FIG. 2 illustrating the teaching of this invention.

Referring now to FIG. 2, the nuclear fuel material 16 forming the central core of the fuel element 14 is surrounded by a cladding 17 hereinafter in this description also referred to as a composite cladding. The composite cladding has a substrate 21 selected from conventional cladding materials such as stainless steel and zirconium alloys and in a preferred embodiment of this invention the substrate is a zirconium alloy such as Zircaloy-2. The substrate has metallurgically bonded on the inside diameter thereof a metal barrier 22 so that the metal barrier forms a shield between the substrate and the nuclear fuel material held in the cladding. The metal barrier forms about 1 to about 30 percent of the thickness of the cladding and is comprised of a low neutron absorption metal of substantially pure zirconium. The metal barrier 22 serves as a preferential reaction site for gaseous impurities and fission products and protects the substrate portion of the cladding from contact and reaction with such impurities and fission products.

The purity of the metal of the metal barrier is an important quality and serves to impart special properties to the metal barrier. Generally there is less than about 1000 parts per million impurities in the metal of the metal barrier and preferably less than about 500 parts per million. Of these oxygen is kept to a level less than about 200 parts per million.

The composite cladding of the nuclear fuel element of this invention has the metal barrier metallurgically bonded to the substrate in a strong bond. Metallographic examination shows that there is sufficient cross diffusion of the substrate and the metal barrier to form a bond, but insufficient cross diffusion to contaminate the barrier itself to any extent away from the area of the bond.

It has been discovered that the substantially pure zirconium metal forming the metal barrier in the composite cladding is highly resistant to radiation hardening and this enables the metal barrier after prolonged irradiation to maintain its structural properties such as yield strength and hardness at the same level as conventional zirconium alloys prior to irradiation. In effect the metal barrier has a very low irradiation hardening property, and this together with its initially low yield strength enables the metal barrier to deform plastically and relieve pellet-induced stresses in the fuel element during power transients. Pellet induced stresses in the fuel element can be brought about, for example, by swelling of the pellets of nuclear fuel at reactor operating temperatures (300° to 350° C.) so that the pellet comes into contact with the cladding.

It has further been discovered that a metal barrier of zirconium of the order preferably about 5 to 15 percent of the thickness of the cladding and a particularly preferred thickness of 10 percent of the cladding metallurgically bonded to the substrate of a zirconium alloy provides stress reduction and a barrier effect sufficient to prevent failures in the substrate of the cladding.

The composite cladding used in the nuclear fuel elements of this invention can be fabricated by any of the following methods.

In one method a hollow tube of the metal selected to be the metal barrier is inserted into a hollow billet of the alloy selected to be the substrate and then the assembly is subjected to explosive bonding of the collar to the billet. The composite is extruded at elevated temperature of about 1000° to about 1400° F. (about 538° to about 750° C.) using conventional tube shell extrusion techniques. The extruded composite is then subjected to a process involving conventional tube reduction until the desired size of cladding is achieved.

In another method, a hollow tube of the metal selected to be the metal barrier is inserted into a hollow billet of the alloy selected to be the substrate and then the assembly is subjected to a heating step [such as at 1400° F. (750° C.) for about 8 hours] to give diffusion bonding between the tube and the billet. The composite is then extruded using conventional tube shell extrusion techniques and the extruded composite is subjected to a process involving conventional tube reduction until the desired size of cladding is achieved.

In still another method, a hollow tube of the metal selected to be the metal barrier is inserted into a hollow billet of the alloy selected to be the substrate and the assembly is extruded using conventional tube shell extrusion techniques. Then the extruded composite is subjected to a process involving conventional tube reduction until the desired size of cladding is achieved.

The foregoing processes of fabricating the composite cladding of this invention gives economies over other processes used in fabricating cladding such as electroplating or vapor deposition.

The dimensions of the starting materials are determined by ratios of the cross sectional areas of the metal barrier and the substrate portions of the composite cladding. For example, the total cross sectional area of the final cladding is given by $$A_{TF} = \pi/4 \; (OD_{TF}^2 - ID_{TF}^2),$$

where $A_{TF}$ is the area of the final product, $OD_{TF}$ is the outer diameter of the final product, and $ID_{TF}$ is the inner diameter of the final product. The cross sectional area of the desired barrier is given by $$A_{BF} = \pi/4 \; (OD_{BF}^2 - ID_{BF}^2),$$

where $A_{BF}$ is cross sectional area of the metal barrier, $OD_{BF}$ is outer diameter of the metal barrier, and $ID_{BF}$ is the inner diameter of the metal barrier. The total cross section of the initial billet of the substrate is given by $$A_{TI} = \pi/4 \; (OD_{TI}^2 - ID_{TI}^2)$$

where $A_{TI}$ is the total cross sectional area of the initial billet including the metal barrier, $OD_{TI}$ is the outer diameter of the initial billet, and $ID_{TI}$ is the inner diameter of the initial billet. The required cross sectional area of the initial barrier is determined by $$A_{BI} = A_{TI}(A_{BF}/A_{TF}).$$

The invention includes a method of producing a nuclear fuel element comprising making a composite cladding container having a substrate and a metal barrier metallurgically bonded to the inside surface of the substrate which container is open at one end, filling the composite cladding container with the nuclear fuel material leaving a cavity at the open end, inserting a nuclear fuel material retaining means into the cavity, applying an enclosure to the open end of the container leaving the cavity in communication with the nuclear fuel, and then bonding the end of the clad container to said enclosure to form a tight seal therebetween.

The present invention offers several advantages promoting a long operating life for the nuclear fuel element including the reduction of chemical attack of the cladding substrate, the minimization of localized stress on the cladding substrate, the minimization of stress and strain corrosion on the cladding substrate, and the reduction of the probability of a splitting failure occurring in the cladding substrate. The invention further prevents expansion (or swelling) of the nuclear fuel into direct contact with the cladding substrate, and this prevents localized stress on the cladding substrate, initiation or acceleration of stress corrosion of the cladding substrate and bonding of the nuclear fuel to the cladding substrate.

An important property of the composite cladding of this invention is that the foregoing improvements are achieved with a negligible additional neutron penalty. Such a cladding is readily accepted in nuclear reactors since the cladding would have no eutectic formation during a loss of cooling accident or an accident involving the dropping of a nuclear control rod. Further the composite cladding has a very small heat transfer penalty in that there is no thermal barrier to transfer of heat such as results in the situation where a separate foil or liner is inserted in a fuel element. Also the composite cladding of this invention is inspectable by conventional non-destructive testing methods during various stages of fabrication.

Those skilled in the art will gain a further understanding of this invention from the following illustrative, but not limiting, examples of this invention.

EXAMPLES 1 AND 2

Billets and insert tubes were machined, cleaned and assembled by standard procedures for extrusion, and all dimensions were chosen so that the composite billets could be extruded in a hot extrusion press. The billets were normal Zircaloy-2 conforming to ASTM B353, Grade RA-1, and the inserts were made of high purity (Crystal Bar) zirconium. All billet bores and inserts had an 8 mil per inch taper and were pressed together to ensure a good contact between the mating surfaces. The dimensions of the machined parts were as follows:

|  | Billet Outer Length × Diameter × Inner Diameter | Metal Barrier Outer Diameter × Inner Diameter |
|---|---|---|
| Example 1 | 9.0 × 5.74 × 2.44 | 2.44 × 1.66 |
| Example 2 | 9.0 × 5.74 × 2.44 | 2.44 × 1.66 |

Prior to assembling the billets and inserts the mating surfaces were given a light etch to remove traces of impurities. The etchant used for the Zircaloy-2 and the crystal bar zirconium was a solution of 70 ml $H_2O$, 30 ml $HNO_3$, and 5 ml HF.

To improve the chances for a satisfactory bond between the inserts and the billets during extrusion, it was decided to pre-bond the assemblies. This was accomplished by pressing the tapered inserts into the tapered bore in the billets in vacuum $\leq 20$ μm while maintaining the billet temperature at 1400° F. (750° C.) for 8 hours. Forces applied to the inserts during initial pressing ranging from 30–45,000 Lbs.

Following the heat treatment two billets were ultrasonically tested for bonding. The results indicated the extent of bonding between the insert tube and the billet to be in the order of 20–25% of the interfacial area.

To reduce end-losses during the extrusion a 2" piece of Zircaloy-2 billet was welded on each end of the composite billets and machined flush.

The extrusion of the billets into tube shells was done using the following parameters:

Extrusion rate—6 in/min,
Reduction Ratio—6:1,
Temperature—1100° F. and
Extrusion Force—3500 tons.

All billet surfaces except the bore and the floating mandrel were lubricated with a water soluble lubricant which was baked on at 1300° F. for 1 hour. Both ends of the tube shells were cut clean and the Inner Diameter was honed to remove possible surface flaws and to improve the finish. Final dimensions for the tube shells were:

Outer Diameter—2.500 inches,
Inner Diameter—1.640 inches, and
Length—5 feet.

The final reduction of the tube shells to fuel tubing followed the standard procedure which includes four reductions with cleaning and annealing between each step. The parameters for this process are listed in Table 1.

TABLE 1

| CO-EXTRUDED TUBE REDUCTION PARAMETERS | | | | |
|---|---|---|---|---|
| Step | Outer Diameter | Thickness of Composite | Inner Diameter Insert Tube | % Reduction | Qe* |
| Start with Tube Shell | 2.500 | .430 | 1.650 | — | — |
| Clean for anneal (degrease - soap base caustic) | | | | | |
| Anneal - 1250° F. - 1 Hour | | | | | |
| First Pass | 1.687 | .270 | 1.147 | 57 | 1.2 |
| Clean for anneal | | | | | |
| Anneal 1150° F. - 1 Hour | | | | | |
| Second Pass | 1.125 | .160 | .805 | 60 | 1.4 |
| Clean for anneal | | | | | |
| Anneal 1150° F. - 1 Hour | | | | | |
| Third Pass | .750 | .085 | .580 | 64 | 1.7 |
| Clean for anneal | | | | | |
| Anneal 1150° F. - 1 Hour | | | | | |
| Fourth Pass | .495 | .028 | .439 | 70 | 2.3 |
| Clean for anneal | | | | | |
| Anneal 1070° F. - 2½ to 4 Hours | | | | | |
| Etch to | .494 | .028 | .438 | | |

*Qe is defined as the ratio of percentage of change in wall thickness to percentage of change in mean diameter.

Dimensions of the final product are listed in Table 2.

TABLE 2

|  | Inner Diameter | Outer Diameter | Dimensions in Mils of Inner Diameter Liner |
|---|---|---|---|
| Example 1 | 0.438 | 0.494 | 3.4 ± 0.3 |
| Example 2 | 0.438 | 0.494 | 3.3 ± 0.3 |

Each tube shell yielded in excess of 350 feet of high quality tubing and all interfaces were well bonded.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element which comprises an elongated composite cladding container having a zirconium alloy tube containing constituents other than zirconium in an amount greater than 1000 parts per million and a continuous barrier of zirconium metal of impurity content less than about 500 parts per million of which impurity content the oxygen content is less than about 200 parts per million, said barrier being metallurgically bonded to the inside surface of the alloy tube, said high purity zirconium metal barrier being of thickness from about 1 percent to 30 percent of the thickness of said alloy tube, a central core of a body of nuclear fuel material selected from the group consisting of compounds of uranium, plutonium, thorium and mixtures thereof disposed in and partially filling said container so as to leave a gap between said container and said core and an internal cavity at one end of the container, an enclosure integrally secured and sealed at each end of said container and a nuclear fuel material retaining means positioned in the cavity.

2. The nuclear fuel element of claim 1 in which the zirconium alloy tube is made of Zircaloy-2.

3. The nuclear fuel element of claim 1 in which the nuclear fuel material is a mixture of uranium dioxide.

4. The nuclear fuel element of claim 1 in which the nuclear fuel material is a mixture of uranium dioxide and plutonium dioxide.

* * * * *